United States Patent
Matsumoto et al.

(10) Patent No.: US 8,375,403 B2
(45) Date of Patent: Feb. 12, 2013

(54) OPTICAL DISC DEVICE

(75) Inventors: Koji Matsumoto, Tokyo (JP); Seiji Hamaie, Kawasaki (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 127 days.

(21) Appl. No.: 12/985,432

(22) Filed: Jan. 6, 2011

(65) Prior Publication Data

US 2011/0185373 A1    Jul. 28, 2011

(30) Foreign Application Priority Data

Jan. 26, 2010   (JP) .................................. 2010-014128

(51) Int. Cl.
*G11B 17/056*   (2006.01)
*G11B 33/02*    (2006.01)
(52) U.S. Cl. ........................................ 720/613; 720/657
(58) Field of Classification Search .................. 720/657, 720/613, 610, 601, 600, 641, 648
See application file for complete search history.

(56) References Cited

U.S. PATENT DOCUMENTS

| | | | | |
|---|---|---|---|---|
| 6,337,840 | B1 * | 1/2002 | Nakamura et al. | 720/638 |
| 2003/0086358 | A1 * | 5/2003 | Park et al. | 369/248 |
| 2008/0082993 | A1 * | 4/2008 | Harada et al. | 720/610 |
| 2010/0281492 | A1 * | 11/2010 | Tsai et al. | 720/600 |
| 2011/0185372 | A1 * | 7/2011 | Matsumoto et al. | 720/601 |

FOREIGN PATENT DOCUMENTS

| | | |
|---|---|---|
| JP | 2007-109327 | 4/2007 |
| JP | 2007-265471 | 10/2007 |

* cited by examiner

*Primary Examiner* — Julie Anne Watko
(74) *Attorney, Agent, or Firm* — Antonelli, Terry, Stout & Kraus, LLP.

(57) ABSTRACT

An optical disc device prevents a rail guide from falling off from a bottom case when a housing receives an impact force. The bottom case 2 includes a bottom plate 2a, a side plate 2b and a second bottom plate 2c. The rail guide 3 has a bottom surface 3a, a side surface 3b and an upper surface 3c. The side surface 3b of the rail guide is engaged with the side plate 2b of the bottom case. The rail guide has a convex portion 3d that is located on the side surface 3b of the rail guide, the convex portion extending from the upper surface of the rail guide and being in contact with the second bottom plate 2c of the bottom case. The convex portion 3d prevents the rail guide 3 from falling off from the bottom case 2 when the bottom case 2 is deformed.

5 Claims, 4 Drawing Sheets

AT A NORMAL CONDITION

AT IMPACT

FIG. 4A(1)
AT A NORMAL CONDITION
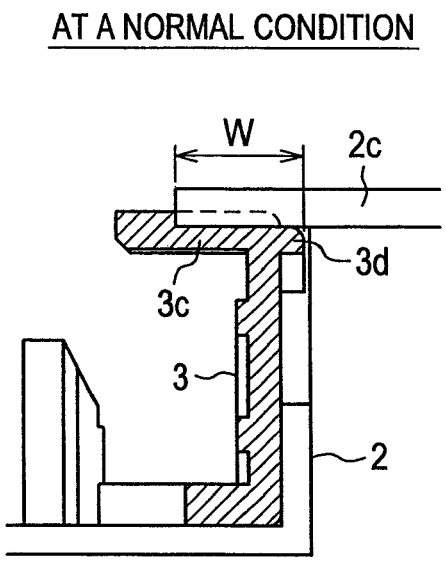
FIG. 4A(2)
AT IMPACT
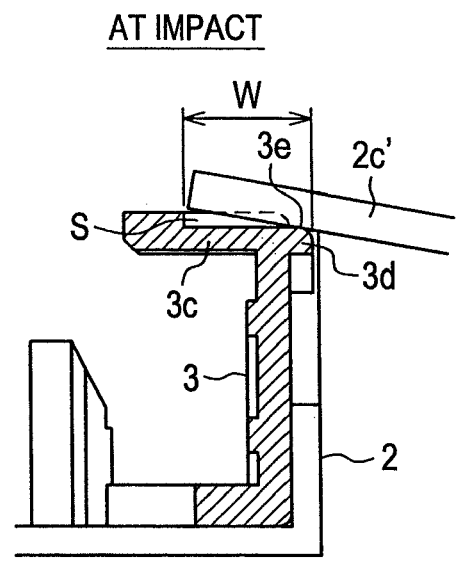
FIG. 4B(1)
(PRIOR ART)
AT A NORMAL CONDITION
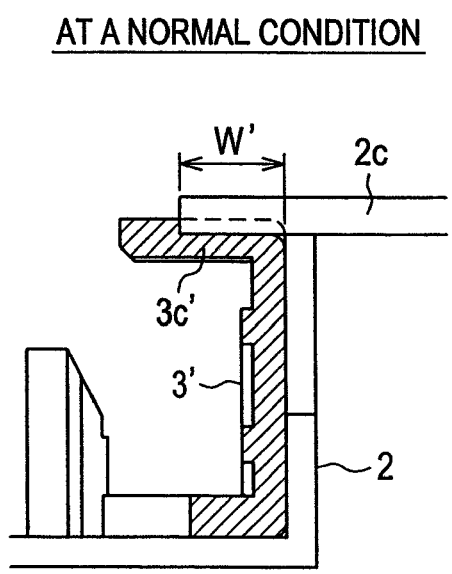
FIG. 4B(2)
(PRIOR ART)
AT IMPACT
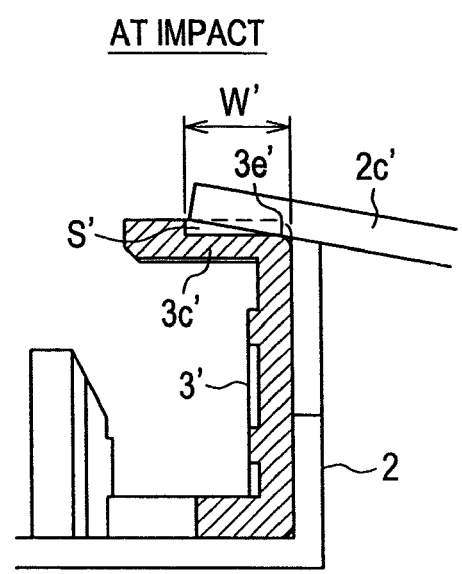

OPTICAL DISC DEVICE

CLAIM OF PRIORITY

The present application claims priority from Japanese patent application serial No. JP 2010-014128, filed on Jan. 26, 2010, the content of which is hereby incorporated by reference into this application.

BACKGROUND OF THE INVENTION (1) Field of the Invention

The present invention relates to an optical disc device that records and reproduces information on and from an optical disc, and more particularly to a structure of a housing that stores a tray on which an optical disc is placed.

(2) Description of the Related Art

In general, an optical disc device that is installed in an electronic device has a tray that is held by a body (housing) of the optical disc device and can be inserted into and ejected from the body (housing) of the optical disc device. While the tray is ejected from the housing, an optical disc is placed on the tray. Then, the tray is inserted into the housing so that the optical disc is stored in the body of the optical disc device. A spindle motor and an optical pickup are attached to the tray. The spindle motor rotates the optical disc. The optical pickup can move in a radial direction of the optical disc. The optical pickup irradiates a recording surface of the optical disc with a laser beam so that information is recorded on or reproduced from the recording surface.

A mechanism for storing, in the housing, the tray that can be inserted into and ejected from the housing includes a housing, a rail, a rail holding section, and a rail guide. The rail movably holds the tray. The rail holding section is attached to the tray and holds the rail. The rail guide is installed in the housing and holds the rail. When a part of the mechanism is deformed due to an external force caused by an operation for ejecting or inserting the tray, the tray may fall off from the housing. In order to prevent the tray from falling, the following structures have been proposed.

JP-A-2007-265471 discloses a structure in which a guide unit is constituted by outer-side rail guides and inner-side rail guides, has rising portions or bent portions, and prevents rails from falling off from the rail guides.

JP-A-2007-109327 discloses a structure in which convex portions that face rail guides for rails minimize deformation of the rails located in the rail guides during ejecting of a tray from a housing, and prevent the tray from falling off from the housing.

SUMMARY OF THE INVENTION

In particular, the thicknesses of optical disc devices that are installed in laptop computers and the like are in a range of 9.5 to 12.7 mm, for example. The thicknesses of optical disc devices tend to be reduced. In addition, there is a demand for an optical disc device that has a reduced weight. Thus, a material that has a small thickness is used for an exterior part of the optical disc device. When the optical disc device receives an impact force from outside the optical disc device, a housing (case) may therefore warp. When the impact force is large, rail guides that are engaged with a bottom case may be disengaged from the bottom case, and whereby a tray may fall off from the case.

JP-A-2007-265471 and JP-A-2007-109327 each describe a technique for preventing the tray (or rails holding the tray) from being disengaged from the rail guides, but do not indicate a technique for preventing the rail guides from falling off from the bottom case.

An object of the present invention is to provide an optical disc device that prevents a rail guide from falling off from a bottom case when an impact force is applied to a housing.

According to the present invention, an optical disc device that stores, in a housing, a tray carrying an optical disc, and records and reproduces information on and from the optical disc, the device including: a rail that holds the tray so that the tray can be inserted into and ejected from the housing; and a rail guide that is attached to a bottom case of the housing so as to movably hold the rail, wherein the bottom case includes a bottom plate, a side plate and a second bottom plate, and has a step shape, wherein the rail guide has a bottom surface, a side surface and an upper surface, and is formed in a substantial U shape in cross section, wherein the side surface of the rail guide is engaged with the side plate of the bottom case, and wherein the rail guide has a convex portion located on the side of the side plate of the bottom case, the convex portion extending from the upper surface of the rail guide and being in contact with the second bottom plate of the bottom case.

It is preferable that the convex portion be located in a portion of the rail guide, the portion of the rail guide being located on the side of a front surface of the housing. In addition, it is preferable that the vertical position of an upper surface of the convex portion be the same as the vertical position of the upper surface of the rail guide. Furthermore, it is preferable that the length of a protruding part of the convex portion be nearly equal to the thickness of the side plate of the bottom case.

According to the present invention, it is possible to prevent the rail guide from falling off from the bottom case when the impact force is applied to the housing. Therefore, the tray can be inserted into and ejected from the housing in a stable manner.

BRIEF DESCRIPTION OF THE DRAWINGS

These and other features, objects and advantages of the present invention will become more apparent from the following description when taken in conjunction with the accompanying drawings wherein:

FIGS. 4A(1) and 4A(2) are diagrams showing an effect to prevent the rail guide according to the embodiment from falling at a normal condition and at impact, respectively; and FIGS. 4B(1) and 4B(2) are diagrams showing a mechanism that causes the conventional rail guide to fall at a normal condition and at impact, respectively.

DETAILED DESCRIPTION OF THE EMBODIMENT

An embodiment of the present invention is described below with reference to the accompanying drawings.

Figure 1:
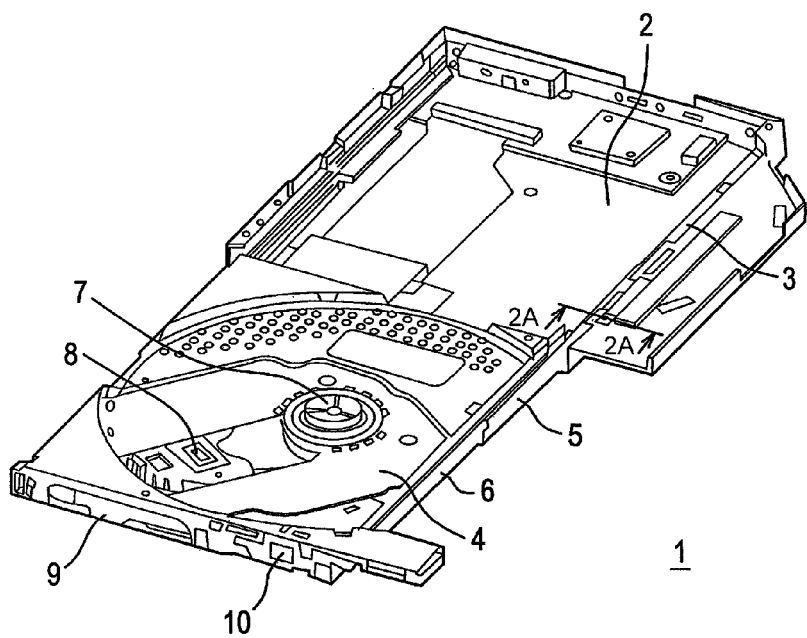
FIG. 1 is a perspective view of the appearance of an optical disc device according to an embodiment of the present invention.

FIG. 1 is a perspective view of the appearance of an optical disc device according to the embodiment of the present invention. FIG. 1 shows the state in which a top case of a housing is removed. As shown in FIG. 1, reference numeral 1 indicates an optical disc device; reference numeral 2 indicates a bottom case; reference numeral 3 indicates a rail guide; reference numeral 4 indicates a tray; reference numeral 5 indicates a rail; reference numeral 6 indicates a rail holding section; reference numeral 7 indicates a spindle motor; reference numeral 8 indicates an optical pickup; reference numeral 9 indicates a bezel; and reference numeral 10 indicates an eject button.

The optical disc device 1 includes a housing (including the bottom case 2 and the top case) and the tray 4. The tray 4 is held so as to be inserted into and ejected from the housing. The spindle motor 7 and the optical pickup 8 are attached to the tray 4. The spindle motor 7 drives and rotates an optical disc. The optical pickup 8 irradiates the optical disc with a laser beam so that information is recorded on or reproduced from the optical disc.

The tray 4 can move and be inserted into and ejected from the housing (bottom case 2) through the rail 5. The rail guide 3 that is attached to the bottom case 2 is held between the bottom case 2 and the rail 5. The rail holding section 6 that is attached to a side surface of the tray 4 is held between the tray 4 and rail 5. A predetermined gap (clearance) is present between the rail guide 3 and the rail 5 and a predetermined gap (clearance) is present between the rail 5 and the rail holding section 6 so that the tray 4 can be smoothly inserted into and ejected from the housing.

In order to store the tray 4 in the housing, the bezel 9 that is provided on a front surface of the tray 4 is pressed toward the housing (bottom case 2), and then the tray 4 is engaged with an engagement portion included in the housing (bottom case 2). In this manner, the tray 4 is stored in and fixed to the housing. In order to eject the tray 4 from the housing, the eject button 10 that is provided on the bezel 9 is pressed and whereby the engagement of the tray 4 with the housing (bottom case 2) is released. In this manner, the tray 4 moves toward the front side of the housing and is ejected from the housing.

Next, the rail guide 3 that is located between the bottom case 2 and the rail 5 is described. In order to compare the rail guide 3 with a conventional rail guide, the conventional rail guide is indicated by reference numeral 3'.

Figure 2A:
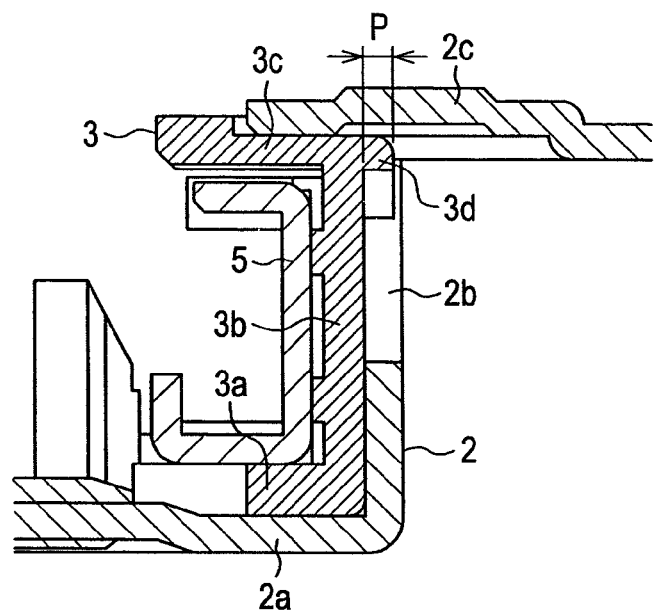
FIG. 2A is a cross sectional view of the optical disc device taken along a line 2A-2A of FIG. 1 and shows a structure that includes a bottom case, a rail guide and a rail.
Figure 2B:
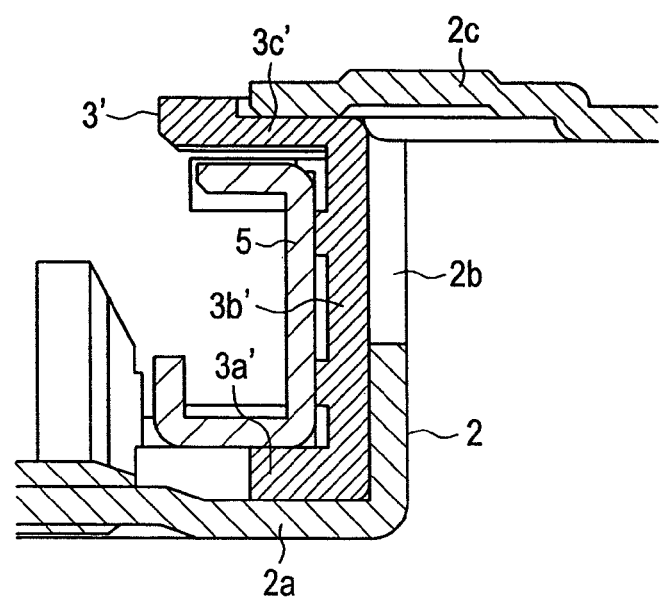
FIG. 2B is a diagram showing a conventional structure that includes a bottom case, a rail guide and a rail.

FIG. 2A is a cross sectional view of a structure of the optical disc device 1 according to the present embodiment, taken along a line 2A-2A of FIG. 1, while the structure includes the bottom case 2, the rail guide 3 and the rail 5. FIG. 2B is a cross sectional view of a conventional structure that includes the bottom case 2, the conventional rail guide 3' and the rail 5. The cross section of the conventional structure shown in FIG. 2B corresponds to the cross section of the structure shown in FIG. 2A. In FIGS. 2A and 2B, the bottom cases 2, the rail guides 3, 3' and the rails 5 are hatched.

First, basis configurations are described. Referring to FIGS. 2A and 2B, the bottom case 2 has a step shape and includes a bottom plate 2a, a side plate 2b and a second bottom plate 2c. The rail guide 3 is formed in a substantial U shape in cross section, while the rail guide 3' is formed in a substantial U shape in cross section. The rail guide 3 has a side surface 3b that is attached to the side plate 2b of the bottom case 2 using an engagement member such as a claw or a hook. The rail guide 3' has a side surface 3b' that is attached to the side plate 2b of the bottom case 2 using an engagement member such as a claw or a hook. A bottom surface 3a of the rail guide 3 is restricted by the bottom plate 2a of the bottom case 2, while a bottom surface 3a' of the rail guide 3' is restricted by the bottom plate 2a of the bottom case 2. An upper surface 3c of the rail guide 3 is restricted by the second bottom plate 2c of the bottom case 2, while an upper surface 3c' of the rail guide 3' is restricted by the second bottom plate 2c of the bottom case 2. The rail guide 3 is fixed to the bottom case 2 and located at a predetermined position in the bottom case 2, while the rail guide 3' is fixed to the bottom case 2 and located at a predetermined position in the bottom case 2. The rail 5 that has a substantial U shape in cross section is located on the side of an inner surface of the rail guide 3, while the rail 5 that has a substantial U shape in cross section is located on the side of an inner surface of the rail guide 3'. The rail 5 can move in a direction (perpendicular to the surface of the sheet of each of FIGS. 2A and 2B) in which the rail 5 extends. The rail holding section 6 shown in FIG. 1 is located on the side of an inner surface of the rail 5 and can move in a direction (perpendicular to the surface of the sheet of each of FIGS. 2A and 2B) in which the rail holding section 6 extends. Thus, the tray 4 can be smoothly inserted into and ejected from the housing (bottom case 2).

In the present embodiment shown in FIG. 2A, the rail guide 3 has a convex portion 3d that is located at an upper end portion of the side surface 3b and extends from the upper surface 3c. The convex portion 3d is inserted in a void portion of the side plate 2b of the bottom case 2 and then a portion of the rail guide 3, which is in contact with the second bottom plate 2c, has a large width. The convex portion 3d therefore prevents the rail guide 3 from falling off from the bottom case 2. In the conventional structure shown in FIG. 2B, in contrast, the side surface 3b' of the rail guide 3' linearly extends in a vertical direction, and the rail guide 3' does not have such a convex portion as shown in FIG. 2A.

The length P of the protruding part of the convex portion 3d is preferably set to such a value that the convex portion 3d does not project from the bottom case 2. For example, when the thickness of the side plate 2b of the bottom case 2 is 0.5 mm, the length P of the protruding part of the convex portion 3d is 0.5 mm. In addition, it is preferable that an upper surface of the convex portion 3d be continuous with the upper surface 3c. As will be described later, as the length P of the protruding part of the convex portion 3d is larger, the effect to prevent the rail guide 3 from falling is more excellent. The length P of the protruding part of the convex portion 3d is set to such a value that the convex portion 3d does not prevent the side surface 3b from being engaged with the side plate 2b of the bottom case 2.

Figure 3A:
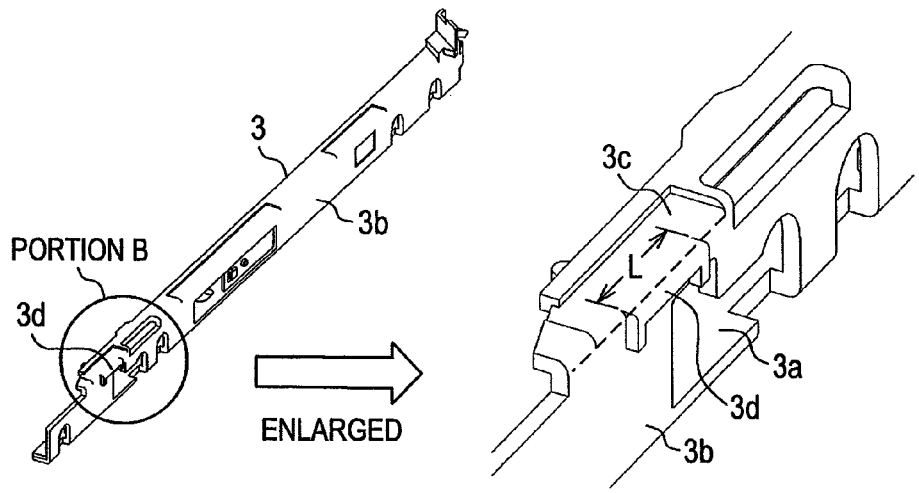
FIG. 3A is perspective and partially enlarged views of a rail guide according to the embodiment of the present invention.
Figure 3B:
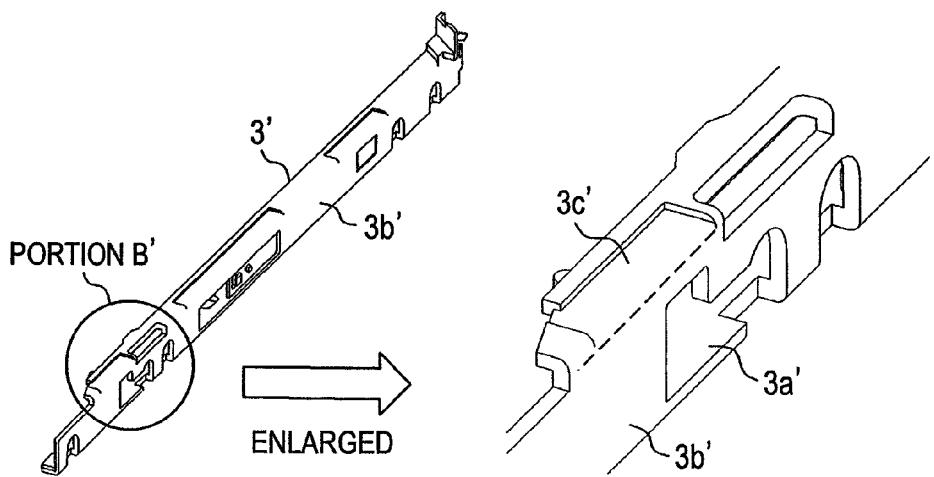
FIG. 3B is perspective and partially enlarged views of a conventional rail guide.

FIG. 3A is a perspective view of the rail guide 3 and a partially enlarged view of a portion B (surrounded by a circle shown in FIG. 3A) of the rail guide 3. FIG. 3B is a perspective view of the rail guide 3' and a partially enlarged view of a portion B' (surrounded by a circle shown in FIG. 3B) of the rail guide 3'. FIG. 3A shows the structure of the rail guide 3 according to the present embodiment, while FIG. 3B shows the structure of the conventional rail guide 3' for comparison. The rail guide 3 has a hook or a claw on each of upper and lower sides thereof so as to be engaged with the side plate 2b of the bottom case 2. The rail guide 3' has a hook or a claw on each of upper and lower sides thereof so as to be engaged with the side plate 2b of the bottom case 2.

In the present embodiment shown in FIG. 3A, the portion B of the rail guide 3 includes the convex portion 3d that is located at the upper end portion of the side surface 3b and extends from the upper surface 3c. The convex portion 3d has a length L in a direction in which the rail guide 3 extends. The length L of the convex portion 3d is set to approximately 5 mm. The length L of the convex portion 3d is set so that the convex portion 3d does not prevent the side surface 3b from being engaged with the side plate 2b of the bottom case 2. The convex portion 3d is included in the portion B and located on a front side of the rail guide 3. This is because when the housing receives an impact force, a portion located on the side of the front surface of the housing (bottom case 2) is easily and largely deformed. The rail guide 3 may have another convex portion located in a portion other than the portion B. The convex portion can be easily formed in a forming process of the rail guide 3.

In contrast, the side surface 3b' of the conventional rail guide 3' shown in FIG. 3B is entirely flat and does not have such a convex portion as shown in FIG. 3A.

FIGS. 4A and 4B are diagrams showing the effect to prevent the rail guide according to the embodiment from falling. FIG. 4A shows the relationship between the bottom case 2 (shown in FIG. 2A) and the rail guide 3 (shown in FIG. 2A) in the present embodiment, while FIG. 4B shows the relationship between the bottom case 2 (shown in FIG. 2B) and the rail guide 3' (shown in FIG. 2B) in the conventional structure for comparison. FIG. 4A schematically shows the outline of the bottom case 2, the outline of the second bottom plate 2c, deformation of the bottom case 2 and deformation of the second bottom plate 2c. In addition, FIG. 4B schematically shows the outline of the bottom case 2, the outline of the second bottom plate 2c, deformation of the bottom case 2 and deformation of the second bottom plate 2c.

First, a mechanism that causes a rail guide to fall is described below. During a normal operation, the bottom case 2 maintains a predetermined shape. When the housing receives an impact force from outside the housing, the bottom case 2 may warp. For example, the second bottom plate 2c of the bottom case 2 may be deformed as shown by a symbol 2c'. In such a case, in the present embodiment, the second bottom plate 2c' is deformed using a corner 3e of the rail guide 3 as a fulcrum point. In the conventional structure, the second bottom plate 2c' is deformed using a corner 3e' of the rail guide 3' as a fulcrum point. As a result, in the present embodiment, a gap S is formed between the second bottom plate 2c' and the upper surface 3c of the rail guide 3. In the conventional structure, a gap S' is formed between the second bottom plate 2c' and the upper surface 3c' of the rail guide 3'. Then, in the present embodiment, the engagement of the rail guide 3 with the bottom case 2 is released, so that the rail guide 3 goes into a state in which the rail guide 3 easily falls off from the bottom case 2. In the conventional structure, the engagement of the rail guide 3' with the bottom case 2 is released, so that the rail guide 3' goes into a state in which the rail guide 3' easily falls off from the bottom case 2. The easiness of falling of the rail guide 3 depends on the width W of the gap S, while the easiness of falling of the rail guide 3' depends on the width W' of the gap S'. As the width W is larger, it is more difficult for the rail guide 3 to fall off from the bottom case 2. As the width W' is larger, it is more difficult for the rail guide 3' to fall off from the bottom case 2. In order to cause the rail guide 3 to fall off from the bottom case 2, it is necessary that the corner 3e be shifted by the width W toward the left side of FIGS. 4A(1) and 4A(2). In order to cause the rail guide 3' to fall off from the bottom case 2, it is necessary that the corner 3e' be shifted by the width W' toward the left side of FIGS. 4B(1) and 4B(2).

The width W of the gap S is nearly equal to the width (contact width) W of a portion (of the rail guide 3) that is in contact with the second bottom plate 2c during the normal operation. The width W' of the gap S' is nearly equal to the width (contact width) W' of a portion (of the rail guide 3') that is in contact with the second bottom plate 2c during the normal operation. The contact width W of the portion of the rail guide 3 (shown in FIGS. 4A(1) and 4A(2)) according to the present embodiment is larger by the length P of the protruding part of the convex portion 3d than the contact width W' of the portion of the conventional rail guide 3' (shown in FIGS. 4B(1) and 4B(2)). Thus, it is difficult for the rail guide to fall off from the bottom case in the structure according to the present embodiment.

As described above, in the present embodiment, the rail guide 3 has the convex portion 3d that prevents the rail guide from falling off from the bottom case when the housing receives an impact force. Therefore, it is possible to insert and eject the tray into and from the housing in a stable manner.

While we have shown and described the embodiment in accordance with our invention, it should be understood that the disclosed embodiment is susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disc device that stores, in a housing, a tray carrying an optical disc, and records and reproduces information on and from the optical disc, the device comprising:
  a rail that holds the tray so that the tray can be inserted into and ejected from the housing; and
  a rail guide that is attached to a bottom case of the housing so as to movably hold the rail,
  wherein the bottom case includes a bottom plate, a side plate and a second bottom plate, and has a step shape,
  wherein the rail guide has a bottom surface, a side surface and an upper surface, and is formed in a substantial U shape in cross section,
  wherein the side surface of the rail guide is engaged with the side plate of the bottom case, and
  wherein the rail guide has a convex portion located on the side of the side plate of the bottom case, the convex portion extending from the upper surface of the rail guide and being in contact with the second bottom plate of the bottom case.

2. The optical disc device according to claim 1,
  wherein the convex portion is located in a portion of the rail guide, the portion of the rail guide being located on the side of a front surface of the housing.

3. The optical disc device according to claim 1,
  wherein the vertical position of an upper surface of the convex portion is the same as the vertical position of the upper surface of the rail guide.

4. The optical disc device according to claim 1,
  wherein the length of a protruding part of the convex portion is nearly equal to the thickness of the side plate of the bottom case.

5. An optical disc device that stores, in a housing, a tray carrying an optical disc, and records and reproduces information on and from the optical disc, the device comprising:
  a rail that holds the tray so that the tray can be inserted into and ejected from the housing; and
  a rail guide that is attached to a bottom case of the housing so as to movably hold the rail,
  wherein the rail guide has a convex portion that prevents the rail guide from falling off from the bottom case when the bottom case is deformed.

* * * * *